(12) United States Patent
Ishikawa

(10) Patent No.: US 12,483,279 B2
(45) Date of Patent: Nov. 25, 2025

(54) COMMUNICATION CIRCUIT AND COMMUNICATION DEVICE

(71) Applicant: Murata Manufacturing Co., Ltd., Nagaokakyo (JP)

(72) Inventor: Mizuho Ishikawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 306 days.

(21) Appl. No.: 18/471,315

(22) Filed: Sep. 21, 2023

(65) Prior Publication Data

US 2024/0113732 A1    Apr. 4, 2024

(30) Foreign Application Priority Data

Sep. 30, 2022  (JP) ................. 2022-157383

(51) Int. Cl.
*H04L 1/00*    (2006.01)
*H04B 1/00*    (2006.01)

(52) U.S. Cl.
CPC ........... *H04B 1/006* (2013.01); *H04B 1/0057* (2013.01); *H04B 1/0078* (2013.01)

(58) Field of Classification Search
CPC .... H04B 1/006; H04B 1/0057; H04B 1/0078; H04B 1/48; H04B 1/52; H04B 1/525; H04B 1/401; H04B 1/0067; H04B 1/40
USPC ..................................................... 455/552.1
See application file for complete search history.

(56) References Cited

U.S. PATENT DOCUMENTS

| | | | |
|---|---|---|---|
| 2016/0365878 A1* | 12/2016 | Balm .................... | H04B 1/006 |
| 2018/0069529 A1* | 3/2018 | Bi ............................ | H03H 9/54 |
| 2018/0358992 A1* | 12/2018 | Fernando ............. | H04B 1/0057 |
| 2019/0190548 A1 | 6/2019 | Chang et al. | |
| 2020/0014429 A1 | 1/2020 | Leung | |
| 2020/0212862 A1* | 7/2020 | Hulsteijn ............. | H04B 1/0458 |
| 2022/0263533 A1 | 8/2022 | Nakazawa | |

FOREIGN PATENT DOCUMENTS

| | | |
|---|---|---|
| CN | 216490480 U | 5/2022 |
| JP | 2004-007732 A | 1/2004 |
| JP | 2020-072468 A | 5/2020 |
| JP | 2022-037035 A | 3/2022 |
| WO | 2021/206176 A1 | 10/2021 |

\* cited by examiner

*Primary Examiner* — Tanmay K Shah
(74) *Attorney, Agent, or Firm* — XSENSUS LLP

(57) ABSTRACT

A communication circuit includes a transmission terminal to which a transmission signal is supplied, a first duplexer that has a transmission node, a reception node, and a common node, a first filter that has a first end part electrically connected to the common node of the first duplexer and a second end part electrically connected to an antenna terminal, a first auxiliary output terminal that outputs the transmission signal to an external circuit, an inductor that is part of a second filter and has a first end part and a second end part that is electrically connected to the first auxiliary output terminal, and a first switch that switches the electrical connection destination of the transmission terminal between the transmission node of the first duplexer and the first end part of the inductor.

15 Claims, 11 Drawing Sheets

COMMUNICATION CIRCUIT AND COMMUNICATION DEVICE

CROSS-REFERENCE TO RELATED APPLICATION

The present application claims priority of Japanese Patent Application No. 2022-157383 filed on Sep. 30, 2022, the entire contents of the above-identified application, including the specification, drawings, and claims are incorporated herein by reference in their entirety.

BACKGROUND

1. Field

The present disclosure relates to communication circuits and communication devices.

2. Description of the Related Art

There is a radio frequency switch in which a plurality of switching elements is provided between a transmission port, a first antenna port, a second antenna port, and an external connection port (see, for example, Japanese Unexamined Patent Application Publication No. 2020-72468 (patent document 1)).

SUMMARY

As recognized by the inventor, in the radio frequency switch of the patent document 1, by switching on and off of each of the plurality of switching elements, a signal transmitting path can be formed from the transmission port to the first antenna port, the second antenna port, or the external connection port via a duplexer. Furthermore, in the radio frequency switch, by switching on and off of each of the plurality of switching elements, a signal transmitting path can be formed from the transmission port to the first antenna port, the second antenna port, or the external connection port without going through a duplexer.

Further, the patent document 1 discloses the configuration in which a low pass filter is provided between the first antenna port and the plurality of switching elements, between the second antenna port and the plurality of switching elements, and between the external connection port and the plurality of switching elements.

As described above, with the configuration in which a low pass filter is connected to each of the first antenna port, the second antenna port, and the external connection port, the circuit size of the radio frequency switch becomes greater.

The present disclosure is made in view of such circumstances, and provides a communication circuit and a communication device, each of which has a configuration in which a signal transmitting path including a duplexer and a signal transmitting path including no duplexer can be switched therebetween and is capable of suppressing an increase in circuit size and allowing a signal to pass a filter in both the signal transmitting paths.

A communication circuit according to one aspect of the present disclosure includes: a transmission terminal to which a transmission signal is supplied; a first duplexer that has a transmission node, a reception node, and a common node; a first filter that has a first end part electrically connected to the common node of the first duplexer and a second end part electrically connected to an antenna terminal; a first auxiliary output terminal that outputs the transmission signal to an external circuit; a first element that is part of a second filter and has a first end part and a second end part, the second end part being electrically connected to the first auxiliary output terminal; and a first switch that switches an electrical connection destination of the transmission terminal between the transmission node of the first duplexer and the first end part of the first element.

Further, a communication circuit according to another aspect of the present disclosure includes: a transmission terminal to which a transmission signal is supplied; an antenna terminal; a variable filter that has a first end part and a second end part; a first auxiliary output terminal that outputs the transmission signal to an external circuit; a first duplexer that has a transmission node, a reception node, and a common node; a wiring line that has a first end part and a second end part; a first switch that switches an electrical connection destination of the transmission terminal between the transmission node of the first duplexer and the first end part of the wiring line; a second switch that switches an electrical connection destination of the first end part of the variable filter between the common node of the first duplexer and the second end part of the wiring line; and a third switch that switches an electrical connection destination of the second end part of the variable filter between the first auxiliary output terminal and the antenna terminal.

According to the present disclosure, it becomes possible to provide a communication circuit and a communication device, each of which has a configuration in which a signal transmitting path including a duplexer and a signal transmitting path including no duplexer can be switched therebetween and is capable of suppressing an increase in circuit size and allowing a signal to pass a filter in both the signal transmitting paths.

DETAILED DESCRIPTION

Figure 1:
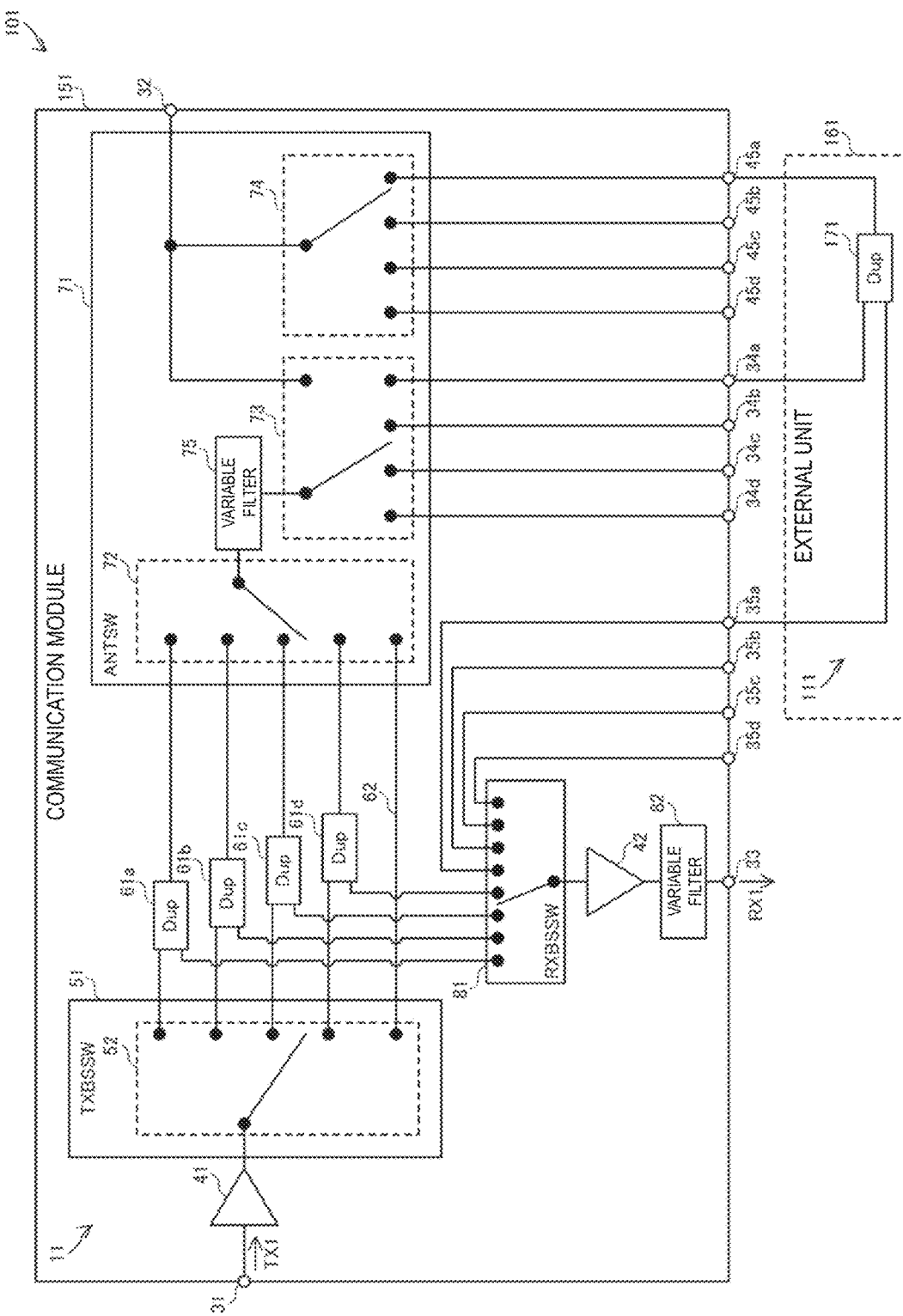
FIG. 1 is a diagram illustrating a configuration of a communication device.

Hereinafter, embodiments of the present disclosure will be described in detail with reference to the drawings. Note that same reference characters are attached to same constituting elements, and overlapping descriptions are omitted as much as possible.

First Embodiment

A communication device 101 according to the first embodiment is now described. FIG. 1 is a diagram illustrating a configuration of the communication device 101. As illustrated in FIG. 1, the communication device 101 includes a communication module 151 and an external unit 161.

In the communication module 151, a communication circuit 11 is formed. The communication circuit 11 includes various terminals, a power amplifier 41, a low-noise amplifier 42, a transmission band selection switch unit 51, duplexers 61a (first duplexer), 61b (second duplexer), 61c, and 61d, a wiring line 62, an antenna switch unit 71, a reception band selection switch 81, and a variable filter 82. Hereinafter, in some cases, each of the duplexers 61a, 61b, 61c, and 61d is referred to as a duplexer 61.

The various terminals include a transmission terminal 31, an antenna terminal 32, a reception terminal 33, auxiliary output terminal 34a (first auxiliary output terminal), 34b, 34c, and 34d, auxiliary input terminals 35a, 35b, 35c, and 35d, and input/output terminals 45a (first input/output terminal), 45b, 45c, and 45d. Hereinafter, in some cases, each of the auxiliary output terminals 34a, 34b, 34c, and 34d is referred to as an auxiliary output terminal 34. In some cases, each of the auxiliary input terminals 35a, 35b, 35c, and 35d is referred to as an auxiliary output terminal 35. In some cases, each of the input/output terminals 45a, 45b, 45c, and 45d is referred to as an input/output terminal 45.

The transmission band selection switch unit 51 includes a switch 52 (first switch). The antenna switch unit 71 includes switches 72 (second switch), 73 (third switch), and 74 (fourth switch), and a variable filter 75.

In the external unit 161, an external circuit 111 is formed. The external circuit 111 includes a duplexer 171.

The transmission terminal 31 receives supply of a transmission signal TX1 from, for example, a mobile communication device. The power amplifier 41 has an input terminal that is connected to the transmission terminal 31 and receives the supply of the transmission signal TX1 and an output terminal that is connected to the transmission band selection switch unit 51 and outputs an amplified transmission signal TX1. Note that hereinafter, in some cases, the transmission signal TX1 supplied to the transmission terminal 31 and the transmission signal TX1 amplified by the power amplifier 41 are collectively referred to as the "transmission signal TX1".

The wiring line 62 has a first end part connected to the transmission band selection switch unit 51 and a second end part connected to the antenna switch unit 71. Note that the wiring line 62 is made up of a routing wiring line having a certain length or, for example, made up of a via conductor, a pad, a bump, a land, or the like, which has a relatively short length or no length.

The duplexer 61 has a transmission node connected to the transmission band selection switch unit 51, a reception node connected to the reception band selection switch 81, and a common node connected to the antenna switch unit 71.

In the duplexer 61, for example, a transmission filter whose pass band and stop band are a transmission frequency and a reception frequency, respectively, is provided between the transmission node and the common node, and a reception filter whose stop band and pass band are the transmission frequency and the reception frequency, respectively, is provided between the reception node and the common node.

The duplexers 61a, 61b, 61c, 61d, and 171 have frequency bands different from each other. The band of the duplexer 61 is, for example, a general-purpose band being used normally. The band of the duplexer 171 is, for example, a band being used as an option. Note that the general-purpose band is, for example, a generic band being used in multiple countries. Further, the band being used as an option is, for example, a band associated with a country and an area, or a band associated with an operator.

The low-noise amplifier 42 has an input terminal that is connected to the reception band selection switch 81 and receives the supply of the reception signal RX1 and an output terminal that is connected to the variable filter 82 and outputs an amplified reception signal RX1.

The switch 52 of the transmission band selection switch unit 51 switches the electrical connection destination of the output terminal of the power amplifier 41 between the respective transmission nodes of the duplexers 61a, 61b, 61c, and 61d and the first end part of the wiring line 62.

Specifically, the switch 52 has a first end part connected to the output terminal of the power amplifier 41, a second end part connected to the transmission node of the duplexer 61a, a third end part connected to the transmission node of the duplexer 61b, a fourth end part connected to the transmission node of the duplexer 61c, a fifth end part connected to the transmission node of the duplexer 61d, and a sixth end part connected to the first end part of the wiring line 62.

For example, in response to a control signal output from a control unit of a mobile communication device, the switch 52 electrically connects the first end part to one of the other end parts, consisting of the second to sixth end parts.

The variable filter 75 of the antenna switch unit 71 has a first end part connected to the switch 72 and a second end part connected to the switch 73.

The switch 72 switches the electrical connection destination of the first end part of the variable filter 75 between the respective transmission nodes of the duplexers 61a, 61b, 61c, and 61d and the second end part of the wiring line 62.

Specifically, the switch 72 has a first end part connected to the first end part of the variable filter 75, a second end part connected to the common node of the duplexer 61a, a third end part connected to the common node of the duplexer 61b, a fourth end part connected to the common node of the duplexer 61c, a fifth end part connected to the common node of the duplexer 61d, and a sixth end part connected to the second end part of the wiring line 62.

For example, in response to a control signal, the switch 72 electrically connects the first end part to one of the other end parts, consisting of the second to sixth end parts.

The switch 73 switches the electrical connection destination of the second end part of the variable filter 75 between the auxiliary output terminals 34a, 34b, 34c, and 34d and the antenna terminal 32. The auxiliary output terminal 34 is a terminal for outputting the transmission signal TX1 to the external circuit 111.

Specifically, the switch 73 has a first end part connected to the second end part of the variable filter 75, a second end part connected to the auxiliary output terminal 34a, a third end part connected to the auxiliary output terminal 34b, a fourth end part connected to the auxiliary output terminal 34c, a fifth end part connected to the auxiliary output terminal 34d, and a sixth end part connected to the antenna terminal 32.

For example, in response to a control signal, the switch 73 electrically connects the first end part to one of the other end parts, consisting of the second to sixth end parts.

The switch 74 switches between electrically connecting the antenna terminal 32 to the input/output terminal 45 and electrically not connecting the antenna terminal 32 to the input/output terminal 45. The input/output terminal 45 is a terminal for receiving the supply of the transmission signal TX1 from the external circuit 111 and outputting the reception signal RX1 to the external circuit 111. Note that the input/output terminal 45 does not necessarily allow the transmission signal TX1 to pass. For example, the signal passing through the input/output terminal 45 may only be the reception signal.

Specifically, the switch 74 has a first end part connected to the antenna terminal 32, a second end part connected to the input/output terminal 45a, a third end part connected to the input/output terminal 45b, a fourth end part connected to the input/output terminal 45c, and a fifth end part connected to the input/output terminal 45d.

For example, in response to a control signal, the switch 74 electrically insulates the first end part from all the other end parts, consisting of the second to fifth end parts, or electrically connects the first end part to one of the other end parts, consisting of the second to fifth end parts.

The reception band selection switch 81 switches the connection destination of the input terminal of the low-noise amplifier 42 between the respective reception nodes of the duplexers 61a, 61b, 61c, and 61d and the auxiliary input terminals 35a, 35b, 35c, and 35d.

Specifically, the reception band selection switch 81 has a first end part connected to the input terminal of the low-noise amplifier 42, a second end part connected to the reception node of the duplexer 61a, a third end part connected to the reception node of the duplexer 61b, a fourth end part connected to the reception node of the duplexer 61c, a fifth end part connected to the reception node of the duplexer 61d, a sixth end part connected to the auxiliary input terminal 35a, a seventh end part connected to the auxiliary input terminal 35b, an eighth end part connected to the auxiliary input terminal 35c, and a ninth end part connected to the auxiliary input terminal 35d.

For example, in response to a control signal, the reception band selection switch 81 electrically connects the first end part to one of the other end parts, consisting of the second to ninth end parts.

The duplexer 171 of the external circuit 111 has a transmission node connected to the auxiliary output terminal 34a, a reception node connected to the auxiliary input terminal 35a, and a common node connected to the input/output terminal 45a.

The variable filter 82 has a first end part connected to the output terminal of the low-noise amplifier 42 and a second end part connected to the reception terminal 33.

Figure 2:
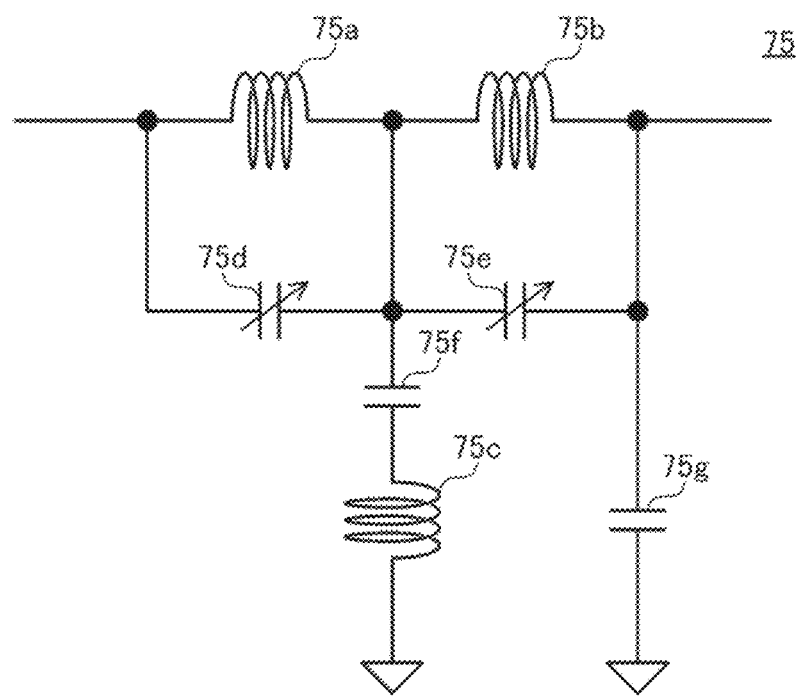
FIG. 2 is a diagram illustrating one example of a circuit of a variable filter.

FIG. 2 is a diagram illustrating one example of a circuit of the variable filter 75. As illustrated in FIG. 2, for example, the variable filter 75 is a low pass filter and is capable of changing the frequency band to be attenuated based on a control signal.

In the present embodiment, the variable filter 75 includes inductors 75a, 75b, and 75c, variable capacitive elements 75d and 75e, and capacitive elements 75f and 75g.

The inductor 75a has a first end part connected to the switch 72 and a second end part. The inductor 75b has a first end part connected to the second end part of the inductor 75a and a second end part connected to the switch 73.

The variable capacitive element 75d has a first end part connected to the first end part of the inductor 75a and a second end part connected to the second end part of the inductor 75a. The variable capacitive element 75e has a first end part connected to the first end part of the inductor 75b and a second end part connected to the second end part of the inductor 75b.

The capacitive element 75f has a first end part connected to the second end part of the inductor 75a and a second end part. The inductor 75c has a first end part connected to the second end part of the capacitive element 75f and a second end part connected to ground. The capacitive element 75g has a first end part connected to the second end part of the inductor 75b and a second end part connected to the ground.

Note that the configuration may alternatively be such that the first end part of the inductor 75a is connected to the switch 73 and the second end part of the inductor 75b is connected to the switch 72. Further, the variable filter 82 may have a circuit configuration similar to that of the variable filter 75.

The switches 52, 72, 73, and 74, the variable filters 75 and 82, and the reception band selection switch 81 operate in conjunction with each other. This will be described specifically in the following section.

Figure 3:
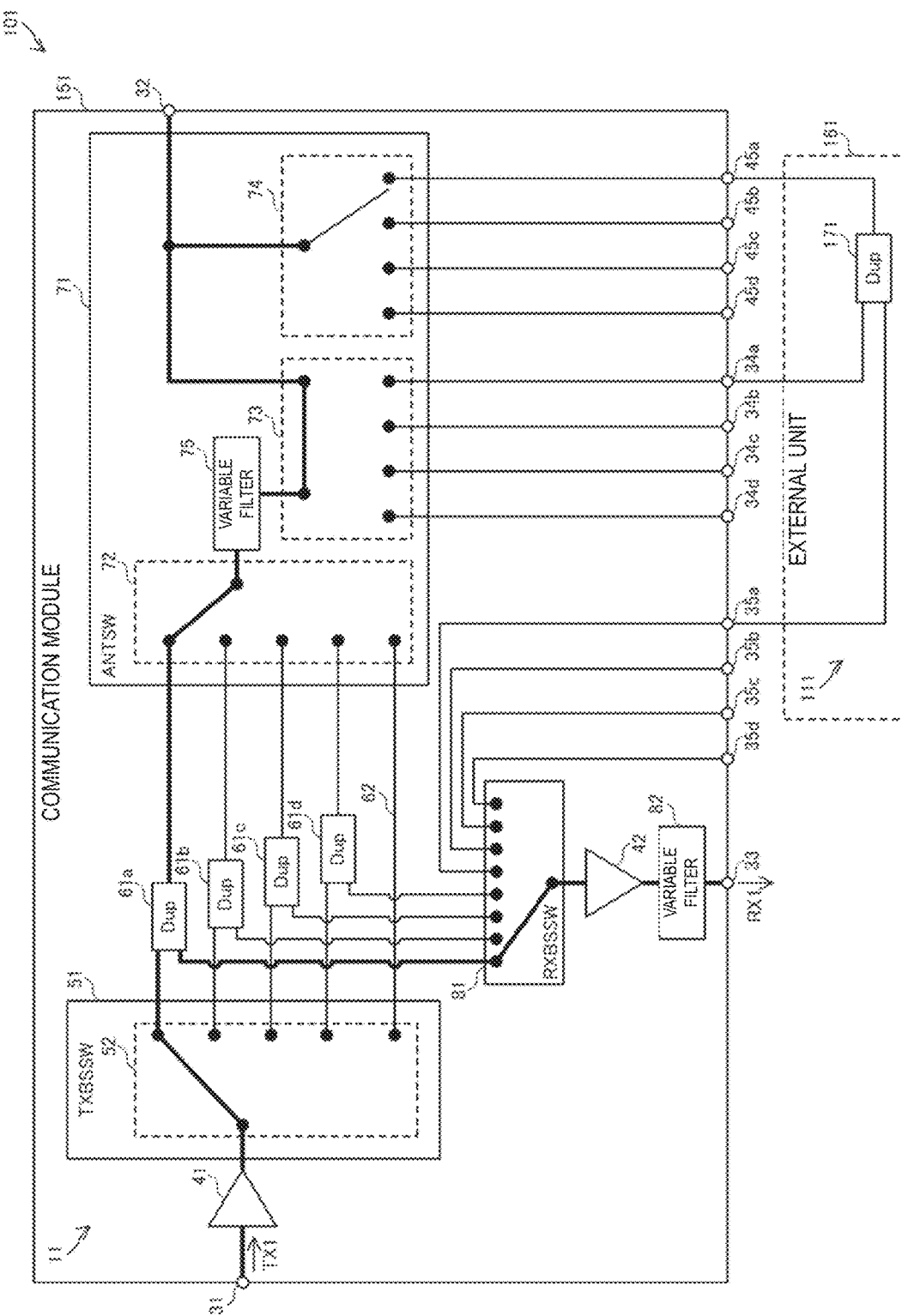
FIG. 3 is a diagram illustrating one example of a path in the communication device, through which a transmission signal and a reception signal are transmitted via a built-in duplexer.

FIG. 3 is a diagram illustrating one example of a path in the communication device 101, through which a transmission signal TX1 and a reception signal RX1 are transmitted via a built-in duplexer 61. As illustrated in FIG. 3, in the switch 52, the first end part connected to the output terminal of the power amplifier 41 is electrically connected to the second end part connected to the transmission node of the duplexer 61a.

In the switch 72, the first end part connected to the first end part of the variable filter 75 is electrically connected to the second end part connected to the common node of the duplexer 61a.

In the switch 73, the first end part connected to the second end part of the variable filter 75 is electrically connected to the sixth end part connected to the antenna terminal 32. In the switch 74, the first end part connected to the antenna terminal 32 is electrically insulated from the other end parts, which consist of the second to fifth end parts and are connected to the input/output terminals 45.

In the reception band selection switch 81, the first end part connected to the input terminal of the low-noise amplifier 42 is electrically connected to the second end part connected to the reception node of the duplexer 61a.

According to this, a signal transmitting path of the transmission signal TX1 from the transmission terminal 31 to the antenna terminal 32 via the duplexer 61a and the variable filter 75 and a signal transmitting path of the reception signal RX1 from the antenna terminal 32 to the reception terminal 33 via the variable filter 75, the duplexer 61a and the variable filter 82 are formed.

In the variable filters 75 and 82, the variable capacitive elements 75d and 75e are adjusted in such a manner as to attenuate a frequency band corresponding to the general-purpose band associated with the duplexer 61a or a frequency band corresponding to the band being used as an option (for example, a frequency band corresponding to a harmonic wave or harmonic waves of the general-purpose band or the band being used as an option).

Note that the signal transmitting paths of the transmission signal TX1 and the reception signal RX1 that go through the duplexer 61b, 61c, or 61d may be formed by operating the switches 52 and 72 and the reception band selection switch 81 in conjunction with each other as needed.

Figure 4:
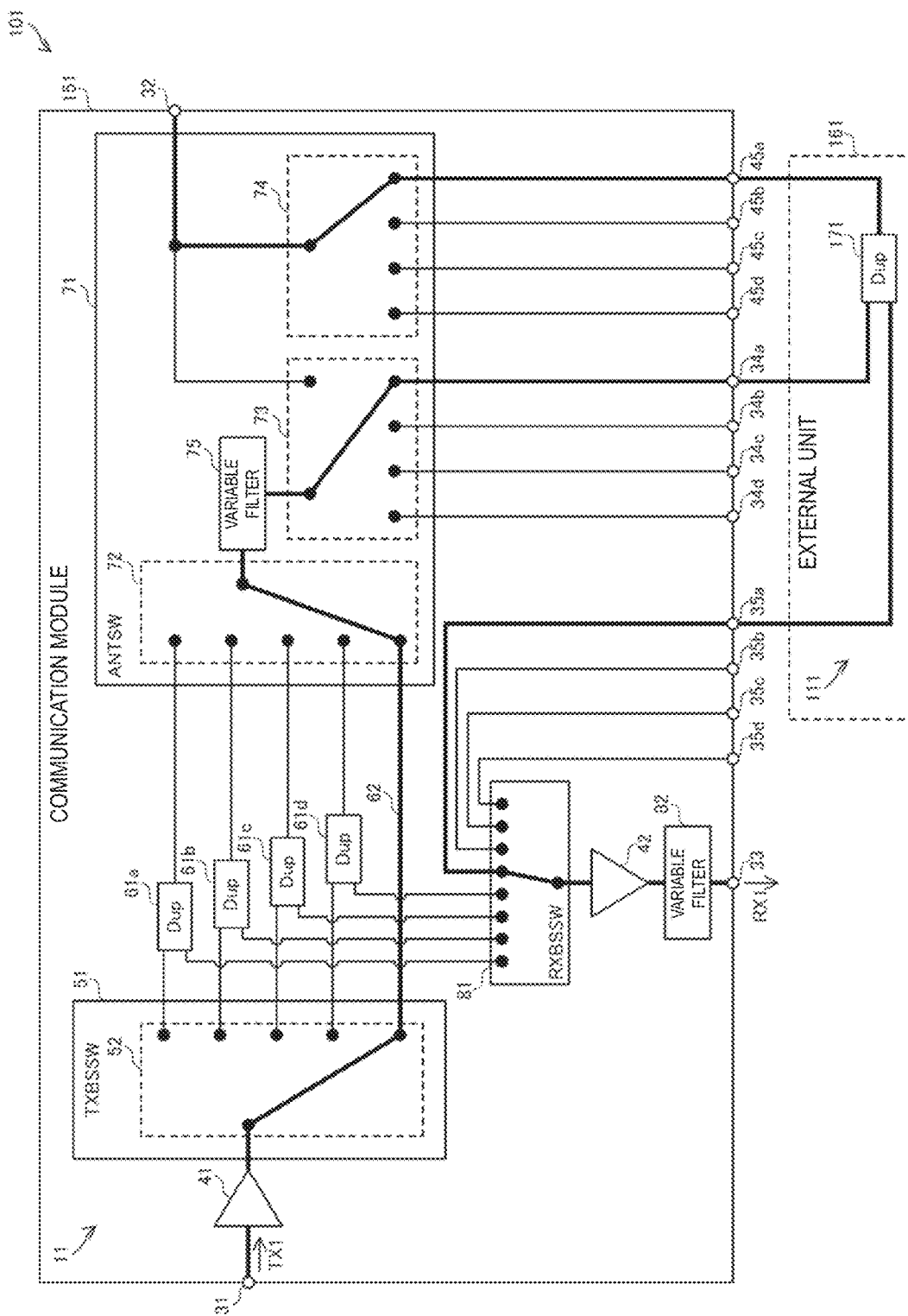
FIG. 4 is a diagram illustrating one example of a path in the communication device, through which a transmission signal and a reception signal are transmitted via an external duplexer.

FIG. 4 is a diagram illustrating one example of a path in the communication device 101, through which the transmission signal TX1 and the reception signal RX1 are transmitted via the external duplexer 171. As illustrated in FIG. 4, in the switch 52, the first end part connected to the output terminal of the power amplifier 41 is electrically connected to the second end part connected to the first end part of the wiring line 62.

In the switch 72, the first end part connected to the first end part of the variable filter 75 is electrically connected to the second end part connected to the second end part of the wiring line 62.

In the switch 73, the first end part connected to the second end part of the variable filter 75 is electrically connected to the second end part connected to the auxiliary output terminal 34a. In the switch 74, the first end part connected to the antenna terminal 32 is electrically connected to the second end part connected to the input/output terminals 45a.

In the reception band selection switch 81, the first end part connected to the input terminal of the low-noise amplifier 42 is electrically connected to the sixth end part connected to the auxiliary input terminal 35a.

According to this, a signal transmitting path of the transmission signal TX1 from the transmission terminal 31 to the antenna terminal 32 via the variable filter 75 and the duplexer 171 and a signal transmitting path of the reception signal RX1 from the antenna terminal 32 to the reception terminal 33 via the duplexer 171 and the variable filter 82 are formed.

In the variable filters 75 and 82, the variable capacitive elements 75d and 75e are adjusted in such a manner as to attenuate a frequency band corresponding to the band being used as an option, which is associated with the duplexer 171, or a frequency band corresponding to the general-purpose band (for example, a frequency band corresponding to a harmonic wave or harmonic waves of the band being used as an option or the general-purpose band).

The attenuation in an attenuation band where a transmission signal TX1 being supplied to the antenna terminal 32 via the duplexer 61 and the variable filter 75 is attenuated by the variable filter 75 is greater than the attenuation in an attenuation band where a transmission signal TX1 being supplied to the auxiliary output terminal 34a via the wiring line 62 and the variable filter 75 is attenuated by the variable filter 75.

Specifically, the transmission signal TX1 being supplied to the antenna terminal 32 via the duplexer 61 and the variable filter 75 is, for example, the transmission signal TX1 being transmitted through the signal transmitting path illustrated in FIG. 3 (hereinafter, may sometimes be referred to as the first transmission signal).

The attenuation band where the first transmission signal is attenuated by the variable filter 75 is a band including a frequency of a harmonic wave or frequencies of harmonic waves of the first transmission signal (hereinafter, may sometimes be referred to as the first attenuation band).

The transmission signal TX1 being supplied to the auxiliary output terminal 34a via the wiring line 62 and the variable filter 75 is, for example, the transmission signal TX1 being transmitted through the signal transmitting path illustrated in FIG. 4 (hereinafter, may sometimes be referred to as the second transmission signal).

The attenuation band where the second transmission signal is attenuated by the variable filter 75 is a band including a frequency of a harmonic wave or frequencies of harmonic waves of the second transmission signal (hereinafter, may sometimes be referred to as the second attenuation band).

Because of the configuration in which the attenuation of the first transmission signal in the first attenuation band is greater than the attenuation of the second transmission signal in the second attenuation band, it becomes possible to ensure preferential characteristic improvement of the first transmission signal, such as suppression of loss of the carrier wave thereof and attenuation of an unwanted wave or unwanted waves, compared with the second transmission signal.

Further, also with regard to the second transmission signal, characteristic improvements can be achieved by adding a filter circuit, a matching circuit, and the like to the external circuit 111.

Note that the configuration in which the communication circuit 11 includes the variable filter 82 has been described. However, the configuration is not limited thereto. Alternatively, the communication circuit 11 may have a configuration that does not include the variable filter 82.

Further, the configuration in which the communication circuit 11 includes one antenna terminal 32 has been described. However, the configuration is not limited thereto. Alternatively, the communication circuit 11 may have a configuration that includes two or more antenna terminals 32. In that case, the configuration may alternatively be such that a switch is provided between the switches 73 and 74 and a plurality of the antenna terminals 32 to enable the switching of the antenna terminal 32 to be connected.

Second Embodiment

A communication device 106 according to the second embodiment is now described. In the second embodiment and subsequent embodiments, descriptions regarding matters common to the first embodiment will be omitted, and only points different from the first embodiment will be described. Particularly, similar functions and effects of similar constituent elements will not be repeated in each embodiment.

Figure 5:
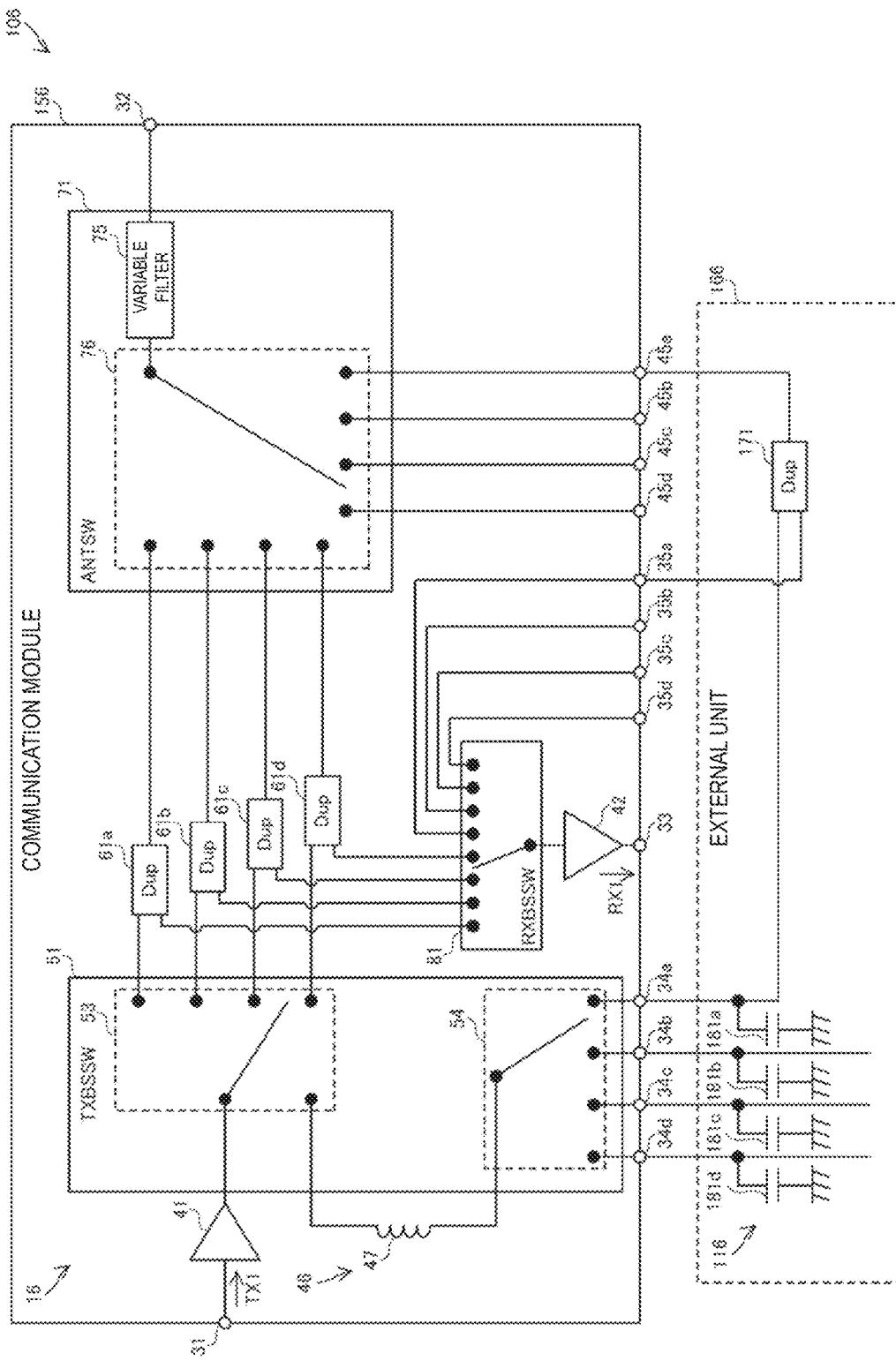
FIG. 5 is a diagram illustrating a configuration of a communication device.

FIG. 5 is a diagram illustrating a configuration of the communication device 106. As illustrated in FIG. 5, the communication device 106 includes a communication module 156 and an external unit 166.

In the communication module 151, a communication circuit 16 is formed. The communication circuit 16 includes various terminals, a power amplifier 41, a low-noise amplifier 42, an inductor 47 (first element and first inductor) which is part of a filter 46 (second filter), a transmission band selection switch unit 51, duplexers 61a (first duplexer), 61b (second duplexer), 61c, and 61d, an antenna switch unit 71, and a reception band selection switch 81.

The various terminals include a transmission terminal 31, an antenna terminal 32, a reception terminal 33, auxiliary output terminal 34a (first auxiliary output terminal), 34b (second auxiliary output terminal), 34c, and 34d, auxiliary input terminals 35a, 35b, 35c, and 35d, and input/output terminals 45a (first input/output terminal), 45b, 45c, and 45d.

The transmission band selection switch unit 51 includes a switch 53 (first switch) and a switch 54 (third switch). The antenna switch unit 71 includes the variable filter 75 (first filter), and a switch 76 (second switch).

In the external unit 166, an external circuit 116 is formed. The external circuit 116 includes a duplexer 171, and capacitive elements (capacitors) 181a (second element), 181b (third element), 181c, and 181d. Hereinafter, in some cases, each of the capacitive elements 181a, 181b, 181c, and 181d is referred to as a capacitive element 181.

The inductor 47 has a first end part connected to the switch 53 and a second end part connected to the switch 54. The switch 53 of the transmission band selection switch unit 51 switches the electrical connection destination of the output terminal of the power amplifier 41 between the respective transmission nodes of the duplexers 61a, 61b, 61c, and 61d and the first end part of the inductor 47.

Specifically, the switch 53 has a first end part connected to the output terminal of the power amplifier 41, a second end part connected to the transmission node of the duplexer 61a, a third end part connected to the transmission node of the duplexer 61b, a fourth end part connected to the transmission node of the duplexer 61c, a fifth end part connected to the transmission node of the duplexer 61d, and a sixth end part connected to the first end part of the inductor 47.

For example, in response to a control signal, the switch 53 electrically connects the first end part to one of the other end parts, consisting of the second to sixth end parts.

The switch 54 switches the electrical connection destination of the second end part of the inductor 47 between the auxiliary output terminals 34a, 34b, 34c, and 34d. The auxiliary output terminal 34 is a terminal for outputting the transmission signal TX1 to the external circuit 116.

Specifically, the switch 54 has a first end part connected to the second end part of the inductor 47, a second end part connected to the auxiliary output terminal 34a, a third end part connected to the auxiliary output terminal 34b, a fourth end part connected to the auxiliary output terminal 34c, and a fifth end part connected to the auxiliary output terminal 34d.

For example, in response to a control signal, the switch 54 electrically connects the first end part to one of the other end parts, consisting of the second to fifth end parts.

The variable filter 75 of the antenna switch unit 71 has a first end part connected to the switch 76 and a second end part connected to the antenna terminal 32.

The switch 76 switches the electrical connection destination of the first end part of the variable filter 75 between the respective transmission nodes of the duplexers 61a, 61b, 61c, and 61d and the input/output terminals 45a, 45b, 45c, and 45d.

Specifically, the switch 76 has a first end part connected to the first end part of the variable filter 75, a second end part connected to the common node of the duplexer 61a, a third end part connected to the common node of the duplexer 61b, a fourth end part connected to the common node of the duplexer 61c, a fifth end part connected to the common node of the duplexer 61d, a sixth end part connected to the input/output terminal 45a, a seventh end part connected to the input/output terminal 45b, an eighth end part connected to the input/output terminal 45c, and a ninth end part connected to the input/output terminal 45d.

For example, in response to a control signal, the switch 76 electrically connects the first end part to one of the other end parts, consisting of the second to ninth end parts.

The reception band selection switch 81 switches the connection destination of the input terminal of the low-noise amplifier 42 between the respective reception nodes of the duplexers 61a, 61b, 61c, and 61d and the auxiliary input terminals 35a, 35b, 35c, and 35d.

Specifically, the reception band selection switch 81 has a first end part connected to the input terminal of the low-noise amplifier 42, a second end part connected to the reception node of the duplexer 61a, a third end part connected to the reception node of the duplexer 61b, a fourth end part connected to the reception node of the duplexer 61c, a fifth end part connected to the reception node of the duplexer 61d, a sixth end part connected to the auxiliary input terminal 35a, a seventh end part connected to the auxiliary input terminal 35b, an eighth end part connected to the auxiliary input terminal 35c, and a ninth end part connected to the auxiliary input terminal 35d.

For example, in response to a control signal, the reception band selection switch 81 electrically connects the first end part to one of the other end parts, consisting of the second to ninth end parts.

The low-noise amplifier 42 has an input terminal that is connected to the reception band selection switch 81 and receives the supply of the reception signal RX1 and an output terminal that is connected to the reception terminal 33 and outputs an amplified reception signal RX1.

The duplexer 171 of the external circuit 116 has a transmission node connected to the auxiliary output terminal 34a, a reception node connected to the auxiliary input terminal 35a, and a common node connected to the input/output terminal 45a.

Each of the capacitive elements 181a, 181b, 181c, and 181d is another part of the filter 46. The capacitive element 181a has a first end part connected to the auxiliary output terminal 34a and a second end part connected to the ground. The capacitive element 181b has a first end part connected to the auxiliary output terminal 34b and a second end part connected to the ground. The capacitive element 181c has a first end part connected to the auxiliary output terminal 34c and a second end part connected to the ground. The capacitive element 181d has a first end part connected to the auxiliary output terminal 34d and a second end part connected to the ground.

The switches 53, 54, and 76, the variable filter 75, and the reception band selection switch 81 operate in conjunction with each other. This will be described specifically in the following section.

Figure 6:
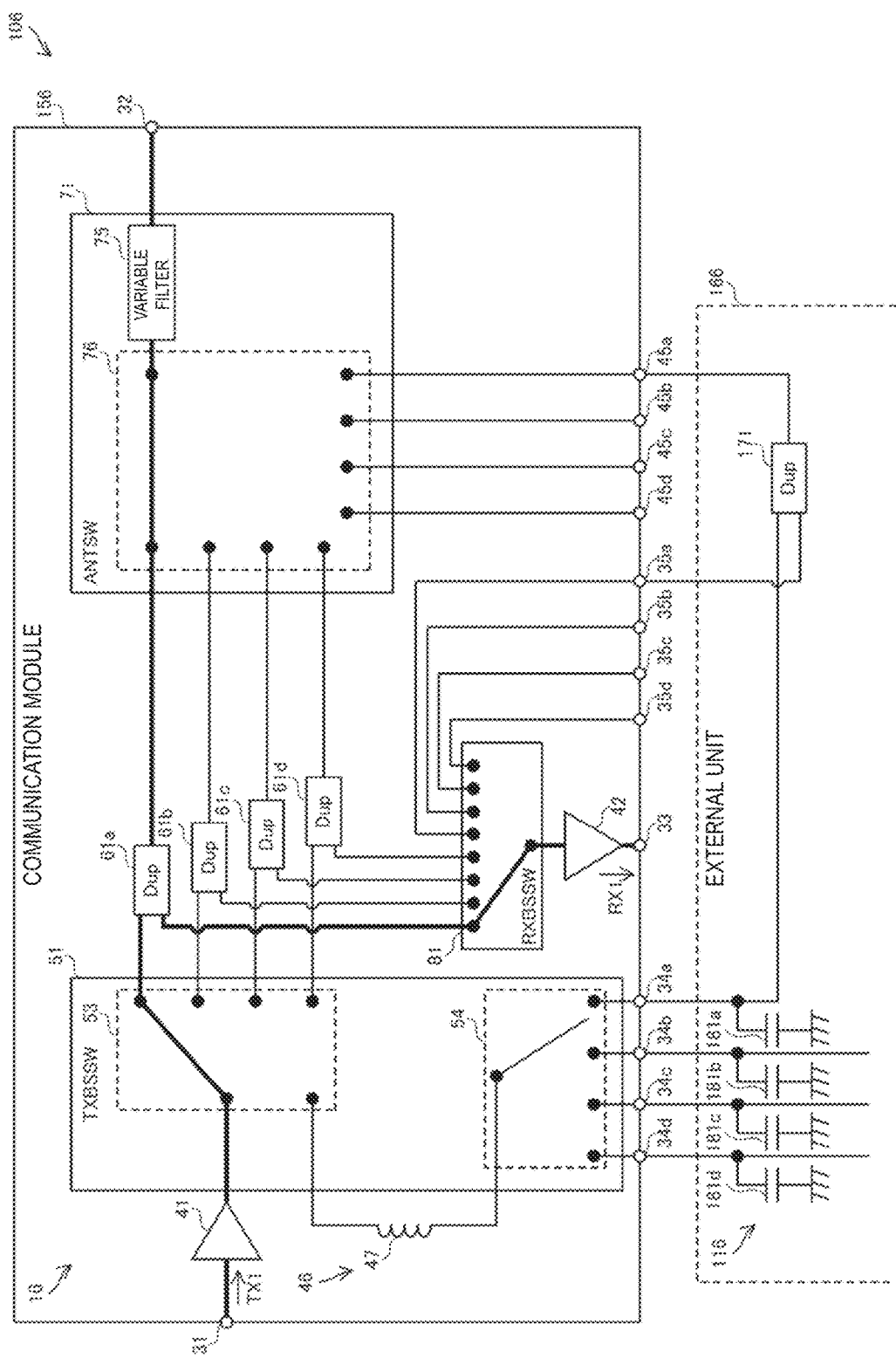
FIG. 6 is a diagram illustrating one example of a path in the communication device, through which a transmission signal and a reception signal are transmitted via a built-in duplexer.

FIG. 6 is a diagram illustrating one example of a path in the communication device 106, through which a transmission signal TX1 and a reception signal RX1 are transmitted via the built-in duplexer 61. As illustrated in FIG. 6, in the switch 53, the first end part connected to the output terminal of the power amplifier 41 is electrically connected to the second end part connected to the transmission node of the duplexer 61a.

In the switch 76, the first end part connected to the first end part of the variable filter 75 is electrically connected to the second end part connected to the common node of the duplexer 61a.

In the reception band selection switch 81, the first end part connected to the input terminal of the low-noise amplifier 42 is electrically connected to the second end part connected to the reception node of the duplexer 61a.

According to this, a signal transmitting path of the transmission signal TX1 from the transmission terminal 31 to the antenna terminal 32 via the duplexer 61a and the variable filter 75 and a signal transmitting path of the reception signal RX1 from the antenna terminal 32 to the reception terminal 33 via the variable filter 75 and the duplexer 61a are formed.

In the variable filter 75, the variable capacitive elements 75d and 75e are adjusted in such a manner as to attenuate a frequency band corresponding to the general-purpose band associated with the duplexer 61a or a frequency band corresponding to the band being used as an option.

Note that the signal transmitting paths of the transmission signal TX1 and the reception signal RX1 that go through the duplexer 61b, 61c, or 61d may be formed by operating the switches 53 and 76 and the reception band selection switch 81 in conjunction with each other as needed.

Figure 7:
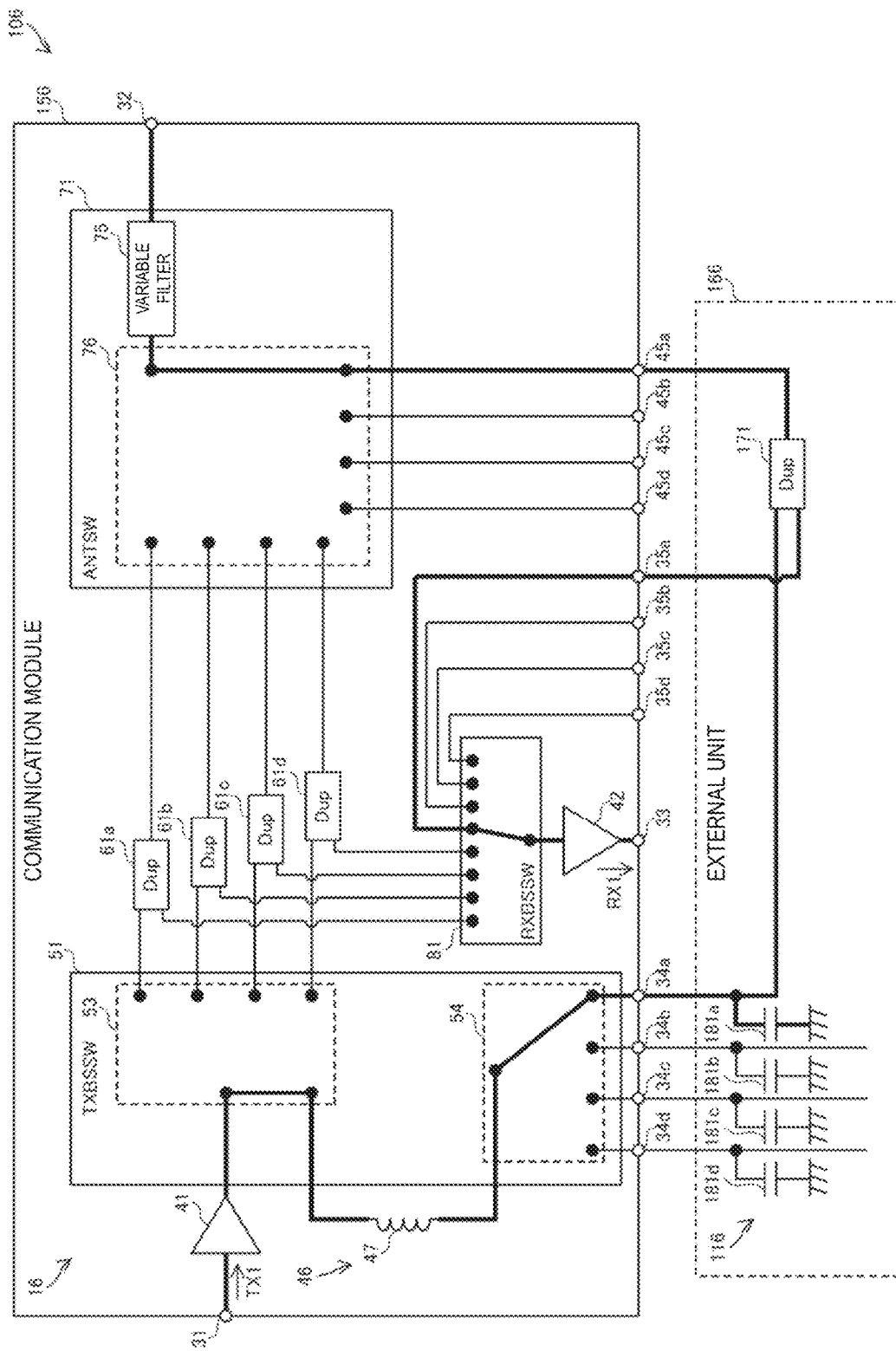
FIG. 7 is a diagram illustrating one example of a path in the communication device, through which a transmission signal and a reception signal are transmitted via an external duplexer.

FIG. 7 is a diagram illustrating one example of a path in the communication device 106, through which the transmission signal TX1 and the reception signal RX1 are transmitted via the external duplexer 171. As illustrated in FIG. 7, in the switch 53, the first end part connected to the output terminal of the power amplifier 41 is electrically connected to the second end part connected to the first end part of the inductor 47.

In the switch 54, the first end part connected to the second end part of the inductor 47 is electrically connected to the second end part connected to the auxiliary output terminal 34a.

In the switch 76, the first end part connected to the first end part of the variable filter 75 is electrically connected to the sixth end part connected to the input/output terminal 45a.

In the reception band selection switch 81, the first end part connected to the input terminal of the low-noise amplifier 42 is electrically connected to the sixth end part connected to the auxiliary input terminal 35a.

According to this, a signal transmitting path of the transmission signal TX1 from the transmission terminal 31 to the antenna terminal 32 via the filter 46 including the inductor 47 and the capacitive element 181a, the duplexer 171, and the variable filter 75 is formed. Further, a signal transmitting path of the reception signal RX1 from the antenna terminal 32 to the reception terminal 33 via the variable filter 75 and the duplexer 171 is formed.

In the variable filter 75, the variable capacitive elements 75d and 75e are adjusted in such a manner as to attenuate a frequency band corresponding to the band being used as an option, which is associated with the duplexer 171, or a frequency band corresponding to the general-purpose band.

Third Embodiment

Figure 8:
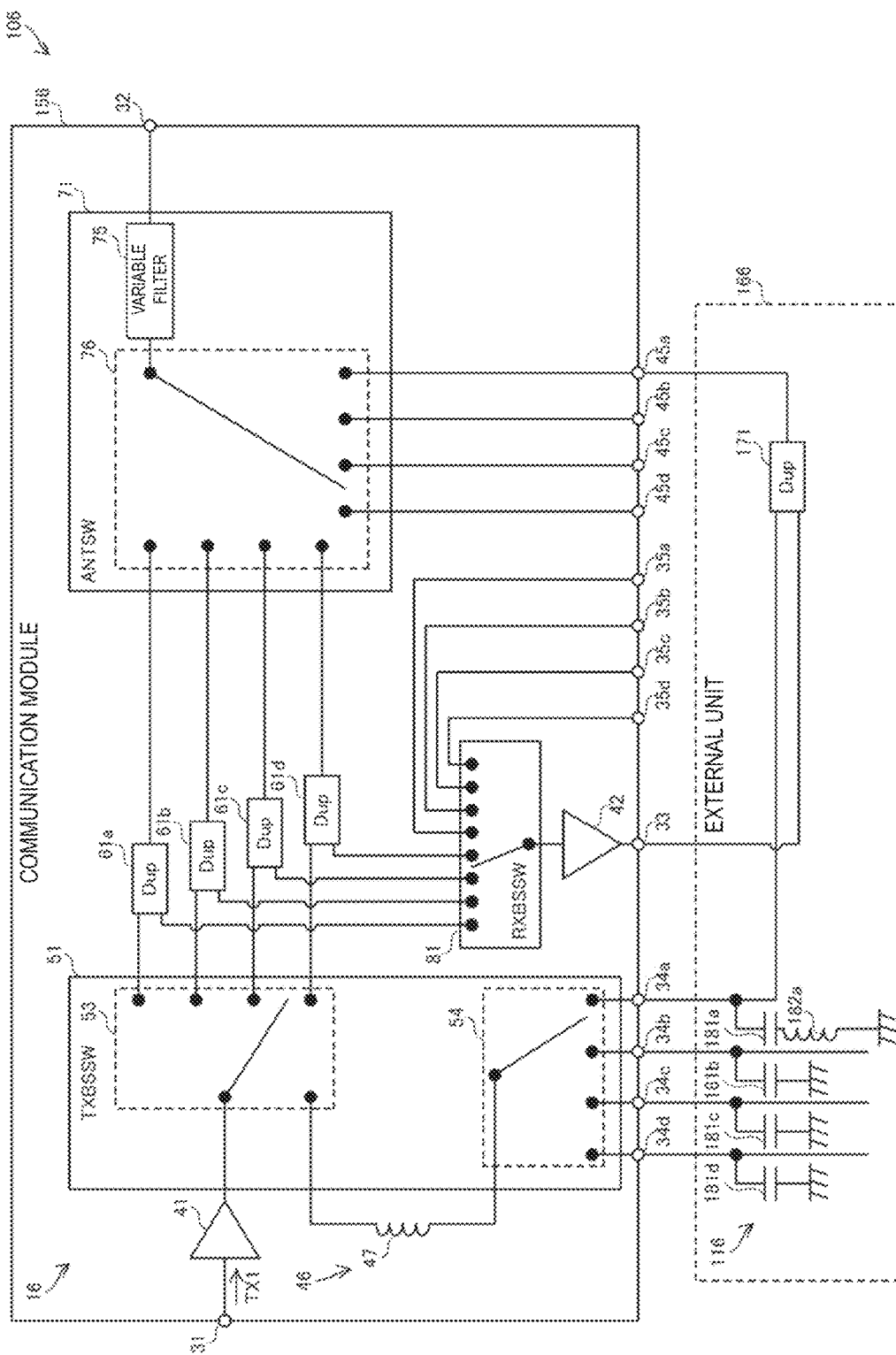
FIG. 8 is a diagram illustrating a configuration of the communication device.

An external circuit 116 according to the third embodiment is now described. FIG. 8 is a diagram illustrating a configuration of a communication device 106. As illustrated in FIG. 8, the external circuit 116 according to the third embodiment is different from the external circuit 116 according to the second embodiment in that an inductor 182a (second inductor) is further included and the inductor 182a is connected in series to the capacitive element 181a.

In the present embodiment, the filter 46 includes the inductor 47, the capacitive element 181a, and the inductor 182a, and the capacitive element 181a and the inductor 182a are provided between the second end part of the inductor 47 and the ground.

According to the configuration described above, compared with the filter 46 illustrated in FIG. 5, it becomes possible to increase the attenuation in a frequency band of an Nth (N is an integer greater than or equal to 2) harmonic wave.

Fourth Embodiment

Figure 9:
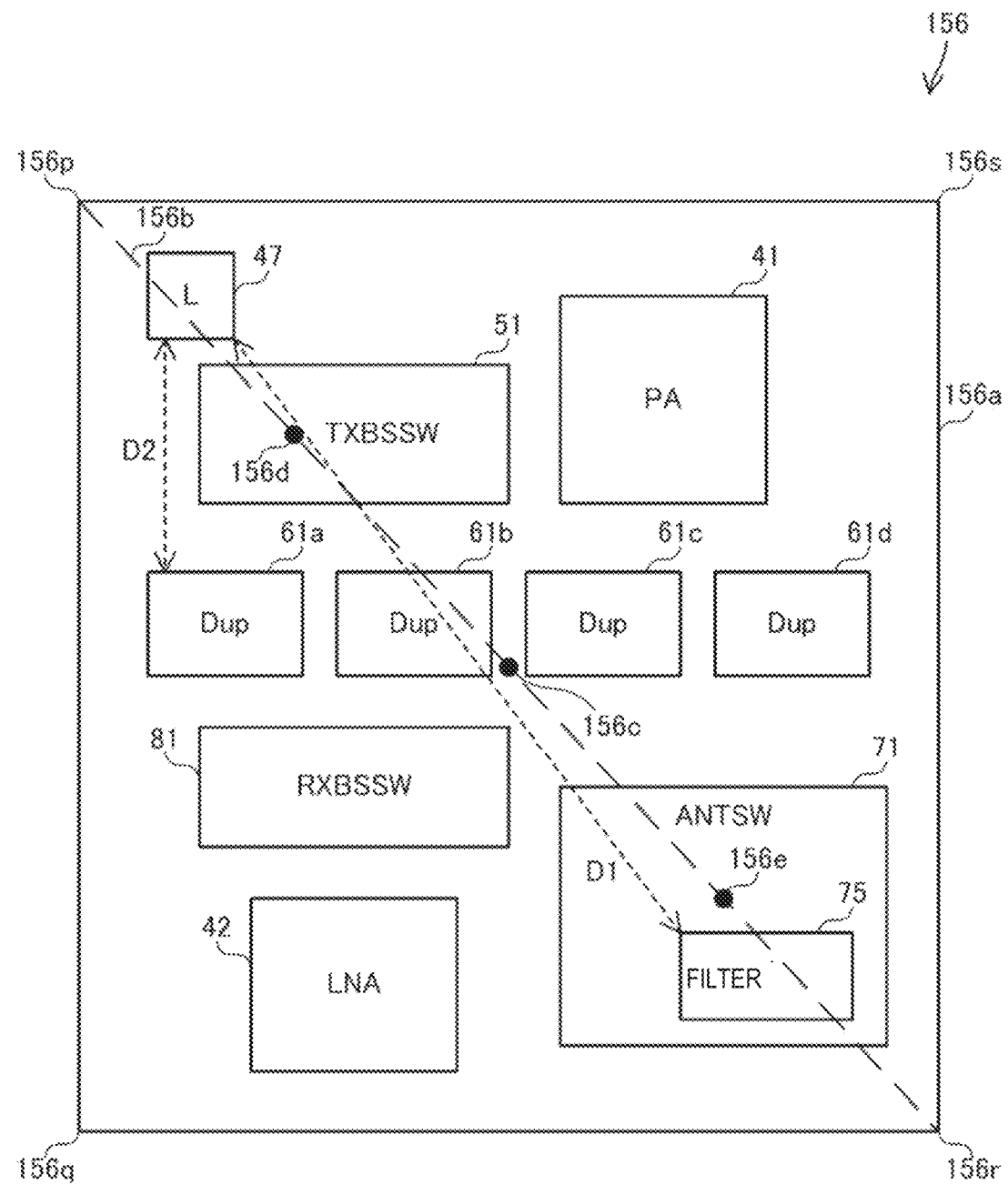
FIG. 9 is a plan view illustrating one example of layout of a communication module.

A layout of a communication module 156 according to the fourth embodiment is now described. FIG. 9 is a plan view illustrating one example of layout of the communication module 156. As illustrated in FIG. 9, in the communication module 156 according to the fourth embodiment, each of constituent elements that make up the communication device 106 are mounted on a rectangular module board 156a using a bump or a bonding wire.

On the module board 156a, a distance D1 between the inductor 47 and the variable filter 75 (or antenna switch IC (71) in which the variable filter 75 is included) is greater than a distance D2 between the inductor 47 and the duplexer 61a.

Further, on the module board 156a, other components such as the transmission band selection switch unit 51 and the duplexer 61b are provided between the inductor 47 and the variable filter 75.

Further, the module board 156a has rectangular corners 156p, 156q, 156r, and 156s. In the present embodiment, the inductor 47 and the variable filter 75 are arranged on a diagonal line 156b connecting the corners 156p and 156r that are at opposing diagonal positions on the module board 156a. Note that "arranged on the diagonal line 156b" includes not only the case where the inductor 47 and the variable filter 75 are positioned exactly on the diagonal line 156b but also the case where the inductor 47 and the variable filter 75 are positioned in the vicinity of the corners 156p and 156r that are at the opposing diagonal positions.

Further, a point 156c is a midpoint between the corners 156p and 156r. A point 156d is a midpoint between the corner 156p and the point 156c. A point 156e is a midpoint between the corner 156r and the point 156c. On the module board 156a, the distance D1 is longer than ¼ of length of the diagonal line 156b. Here, ¼ of length of the diagonal line 156b is, for example, the distance between the corner 156p and the point 156d. Note that the distance between the corner 156p and the point 156d, the distance between the point 156d and the point 156c, the distance between the point 156c and the point 156e, and the distance between the point 156e and the corner 156r are the same.

In one aspect, the distance D1 is longer than one-half of length of the diagonal line 156b. Here, one-half of length of the diagonal line 156b is, for example, the distance between the corner 156p and the point 156c. Note that the distance between the corner 156p and the point 156c and the distance between the point 156c and the corner 156r are the same.

In the signal transmitting path illustrated in FIG. 7, the transmission signal TX1 is transmitted from the transmission terminal 31 to the antenna terminal 32 via the filter 46, the duplexer 171, and the variable filter 75. At that time, the inductor 47 electromagnetically couples with an inductor included in the variable filter 75, and characteristic degradation such as generation of noise and decrease in attenuation occurs, in some cases.

In the layout illustrated in FIG. 9, the inductor 47 and the variable filter 75 are separated from each other, and thus the electromagnetic coupling between the inductance included in the variable filter 75 and the inductor 47 can be suppressed. According to this, the characteristic degradation such as generation of noise and decrease in attenuation can be suppressed.

Fifth Embodiment

Figure 10:
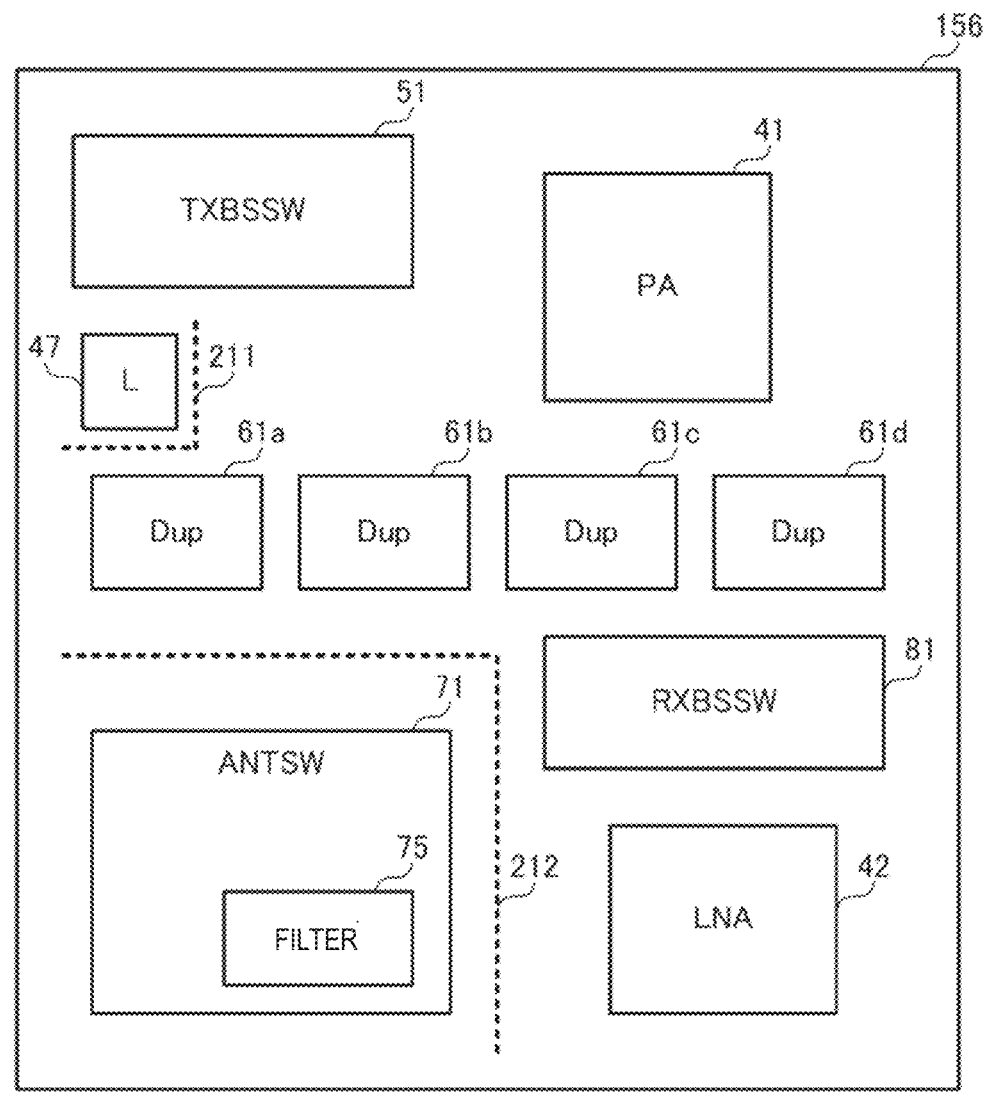
FIG. 10 is a plan view illustrating one example of layout of the communication module.

A layout of a communication module 156 according to the fifth embodiment is now described. FIG. 10 is a plan view illustrating one example of layout of the communication module 156. As illustrated in FIG. 10, the communication module 156 according to the fifth embodiment is different from the communication module 156 according to the fourth embodiment in that shield members 211 and 212 are provided.

The shield members 211 and 212 are positioned between the inductor 47 and the variable filter 75. For example, the shield members 211 and 212 each have a configuration similar to that of the shield wall described in Japanese Unexamined Patent Application Publication No. 2022-37035 (patent document 2).

The shield member 212 has a L-shape form in a plan view as seen from a direction vertical to a principal surface of the communication module 156. The shield member 212 is provided in such a way that a right-angle part of the L-shape is positioned near the center of the communication module 156.

The shield member 211 has a L-shape form in a plan view as seen from a direction vertical to a principal surface of the communication module 156. The shield member 211 is provided in such a way that a right-angle part of the L-shape is positioned near the center of the communication module 156.

As described above, with the configuration in which the shield members 211 and 212 are provided, the electromagnetic coupling between the inductance included in the variable filter 75 and the inductor 47 can be suppressed. According to this, the characteristic degradation such as generation of noise and decrease in attenuation can be suppressed.

Figure 11:
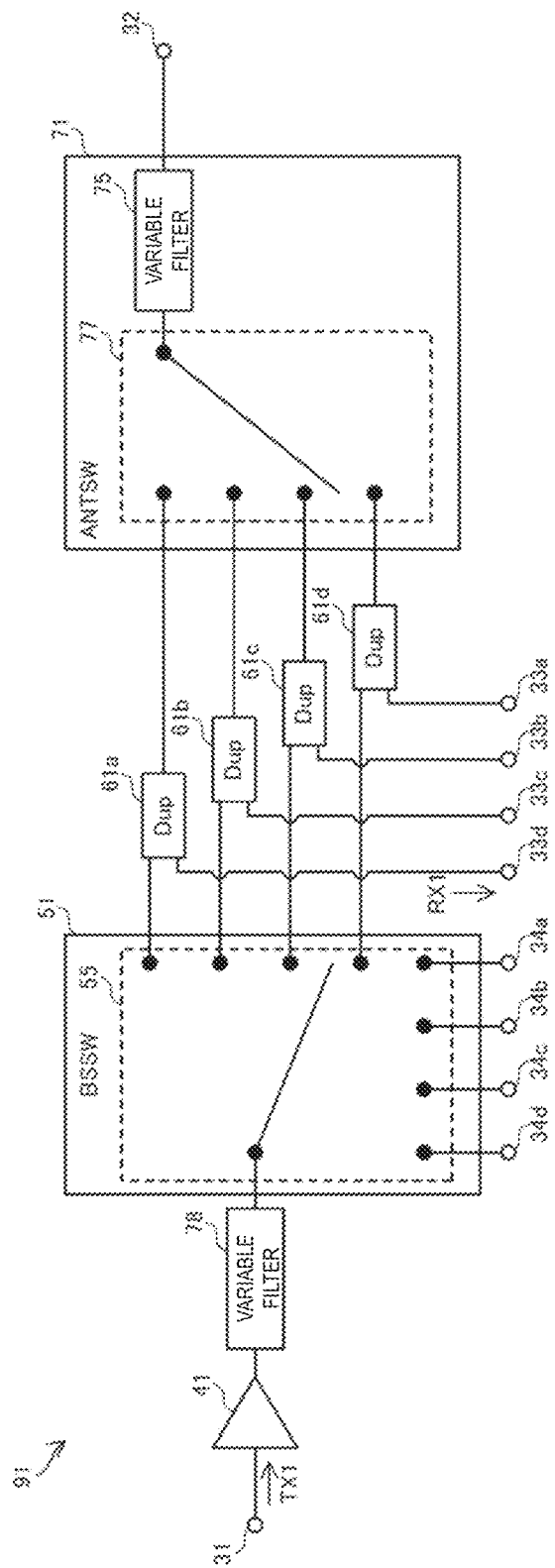
FIG. 11 is a circuit diagram of a communication circuit according to a comparative example.

FIG. 11 is a circuit diagram of a communication circuit 91 according to a comparative example. As illustrated in FIG. 11, in the communication circuit 91, the switch 55 of the transmission band selection switch unit 51 has a first end part connected to the output terminal of the power amplifier 41 via a variable filter 78, a second end part connected to the transmission node of the duplexer 61a, a third end part connected to the transmission node of the duplexer 61b, a fourth end part connected to the transmission node of the duplexer 61c, a fifth end part connected to the transmission node of the duplexer 61d, a sixth end part connected to the auxiliary output terminal 34a, a seventh end part connected to the auxiliary output terminal 34b, an eighth end part connected to the auxiliary output terminal 34c, and a ninth end part connected to the auxiliary output terminal 34d.

For example, in response to a control signal, the switch 55 electrically connects the first end part to one of the other end parts, consisting of the second to ninth end parts.

The reception nodes of the duplexers 61a, 61b, 61c, and 61d are connected to the reception terminals 33a, 33b, 33c, and 33d, respectively.

The switch 77 of the antenna switch unit 71 has a first end part connected to the antenna terminal 32 via the variable filter 75, a second end part connected to the common node of the duplexer 61a, a third end part connected to the common node of the duplexer 61b, a fourth end part connected to the common node of the duplexer 61c, and a fifth end part connected to the common node of the duplexer 61d.

For example, in response to a control signal, the switch 77 electrically connects the first end part to one of the other end parts, consisting of the second to fifth end parts.

In the communication circuit 91, the variable filter 78 is provided between the power amplifier 41 and the transmission band selection switch unit 51. According to this, in a case that the switch 55 electrically connects the variable filter 78 and the auxiliary output terminal 34, the transmission signal TX1 that passes through the variable filter 78 can be output from the auxiliary output terminal 34.

However, the transmission signal TX1, which is being sent from the transmission terminal 31, passing through the duplexer 61, and being output to the antenna terminal 32, passes through two filters, which are the variable filters 78 and 75. Thus, the power loss of the transmission signal TX1 becomes greater, resulting in characteristic degradation.

In contrast, in the communication circuit 11 illustrated in FIG. 1 and the communication circuit 16 illustrated in FIG. 5, it becomes possible to use only one variable filter 75 as the filter through which the transmission signal TX1 being sent from the transmission terminal 31, passing through the duplexer 61, and being output to the antenna terminal 32 passes. Because of this, the power loss of the transmission signal TX1 can be reduced, and thus the characteristic degradation can be suppressed.

Note that the configurations in which the communication circuits 11 and 16 each include four auxiliary output terminals 34 have been described. However, these configurations are not limited thereto. Alternatively, the communication circuits 11 and 16 may each include one, two, three, five, or more auxiliary output terminals 34. In the case where the communication circuit 16 includes one auxiliary output terminal 34, the second end part of the inductor 47 may be directly connected to the auxiliary output terminal 34a without providing the switch 54.

Further, the configurations in which the communication circuits 11 and 16 each include four auxiliary input terminals 35 have been described. However, the configurations are not limited thereto. Alternatively, the communication circuits 11 and 16 may each include one, two, three, five, or more auxiliary input terminals 35.

Further, the configurations in which the communication circuits 11 and 16 each include four input/output terminals 45 have been described. However, these configurations are not limited thereto. Alternatively, the communication circuits 11 and 16 may each include one, two, three, five, or more input/output terminals 45.

Further, the configurations in which the communication circuits 11 and 16 each include the power amplifier 41 have been described. However, these configurations are not limited thereto. Alternatively, the communication circuits 11 and 16 may each have a configuration that does not include the power amplifier 41.

Further, the configurations in which the communication circuits 11 and 16 each include the low-noise amplifier 42 have been described. However, these configurations are not limited thereto. Alternatively, the communication circuits 11 and 16 may each have a configuration that does not include the low-noise amplifier 42. Further, the communication circuits 11 and 16 may each have a configuration that includes two or more low-noise amplifiers 42.

Further, the configurations in which the communication circuits 11 and 16 each include four duplexers 61 have been described. However, these configurations are not limited thereto. Alternatively, the communication circuits 11 and 16 may each include one, two, three, five, or more duplexers 61.

Further, the configurations in which the external circuits 111 and 116 each include the duplexer 171 have been described. However, these configurations are not limited thereto. Alternatively, the external circuits 111 and 116 may each have a configuration that does not include the duplexer 171.

Further, for the communication circuit 16, the configuration in which the output terminal of the low-noise amplifier 42 is directly connected to the reception terminal 33d has been described. However, the configuration is not limited thereto. Alternatively, the configuration may be such that the variable filter 82 is provided between the low-noise amplifier 42 and the reception terminal 33*d*.

Further, the configuration in which the communication circuit 16 includes one antenna terminal 32 has been described. However, the configuration is not limited thereto. Alternatively, the communication circuit 16 may include two or more antenna terminals 32. In that case, the configuration may be such that a switch is provided between the variable filter 75 and a plurality of the antenna terminals 32 to enable the switching of the antenna terminal 32 to be connected.

Further, the configuration in which the communication circuit 16 includes the variable filter 75 has been described. However, the configuration is not limited thereto. For example, in the case where the communication circuit 16 has a configuration in which one duplexer 61 is provided, the configuration may be such that a fixed filter is included as a substitute for the variable filter 75.

Further, for the communication device 106, the configuration in which the first element is an inductor, and the second element is a capacitive element has been described. However, the configuration is not limited thereto. Alternatively, the configuration may be such that the first element is a capacitive element, and the second element is an inductor. In that case, the filter 46 functions as a high pass filter.

Exemplary embodiments of the present disclosure have been described. The communication circuit 16 includes the transmission terminal 31 to which a transmission signal TX1 is supplied, the duplexer 61*a* that has the transmission node, the reception node, and the common node, the first filter having the first end part electrically connected to the common node of the duplexer 61*a* and the second end part electrically connected to the antenna terminal 32, the auxiliary output terminal 34*a* that outputs the transmission signal TX1 to the external circuit 116, the first element that is part of the filter 46 and has the first end part and the second end part that is electrically connected to the auxiliary output terminal 34*a*, and the switch 53 that switches the electrical connection destination of the transmission terminal 31 between the transmission node of the duplexer 61*a* and the first end part of the first element.

According to the configuration described above, in a case that the electrical connection destination of the transmission terminal 31 is switched to the transmission node of the duplexer 61*a* in the switch 53, it becomes possible to form the signal transmitting path from the transmission terminal 31 to the antenna terminal 32 via the duplexer 61*a* and the first filter. Further, in a case that the electrical connection destination of the transmission terminal 31 is switched to the first end part of the first element in the switch 53, it becomes possible to form the signal transmitting path from the transmission terminal 31 to the auxiliary output terminal 34*a* via the first element. The signal transmitting path not including a duplexer includes the first element, which is part of the filter 46. Thus, for example, by connecting another part of the filter 46 to the auxiliary output terminal 34*a*, it becomes possible to provide, also in that signal transmitting path, the filter 46 suitable for frequency characteristics of a signal being transmitted through that path. Further, the circuit size of the filter 46 in the communication circuit 16 can be reduced. Accordingly, in the configuration in which a signal transmitting path including a duplexer and a signal transmitting path including no duplexer can be switched therebetween, it becomes possible to suppress an increase in circuit size and allow a signal to pass a filter in both the signal transmitting paths.

Further, the first filter is the variable filter 75, the communication circuit 16 further includes the duplexer 61*b* that has the transmission node, the reception node, and the common node, and the switch 76 that switches the electrical connection destination of the first end part of the variable filter 75 between the common node of the duplexer 61*a* and the common node of the duplexer 61*b*, and the switch 53 switches the electrical connection destination of the transmission terminal 31 between the transmission node of the duplexer 61*a*, the transmission node of the duplexer 61*b*, and the first end part of the first element.

According to the configuration described above, it becomes possible to add the signal transmitting path from the transmission terminal 31 to the antenna terminal 32 via the duplexer 61*b* and the variable filter 75. Thus, it becomes possible to increase the number of general-purpose bands that can be used in the communication circuit 16. Further, the variable filter 75 can be shared in both the signal transmitting path including the duplexer 61*a* and the signal transmitting path including the duplexer 61*b*, and thus, it becomes possible to add the signal transmitting path without increasing the number of filters in the communication circuit 16.

Further, the external circuit 116 includes the second element that is another part of the filter 46 and has the first end part connected to the auxiliary output terminal 34*a* and the second end part connected to the ground.

As described above, according to the configuration in which the second element is included in the external circuit 116, it becomes possible to complete the filter 46 on the user side of the communication circuit 16. Further, by appropriately setting a constant or constants of the second element, characteristics of the filter 46 can be adjusted. Thus, it becomes possible to mount the filter 46 whose filter characteristic is optimized by a user of the communication circuit 16.

Further, the first element is the first inductor.

According to the configuration described above, the first inductor is connected in series to the signal transmitting path. Thus, the filter 46 can function as a low pass filter, and a harmonic wave or harmonic waves of the transmission signal TX1 can be suppressed. Further, for example, in the case where a plurality of the auxiliary output terminals 34 is provided, the first inductor having a larger size can be shared, and thus, the overall circuit size can be reduced.

Further, the first element is the inductor 47, and the second element is the capacitive element 181*a*.

According to the configuration described above, the filter 46 can function as a low pass filter, and a harmonic wave or harmonic waves of the transmission signal TX1 can be suppressed. Further, for example, in the case where a plurality of the auxiliary output terminals 34 is provided, the first inductor having a larger size can be shared, and thus, the overall circuit size can be reduced.

Further, the external circuit 116 further includes the inductor 182*a* connected in series to the capacitive element 181*a*.

According to the configuration described above, it becomes possible to increase the attenuation in a frequency band of an Nth harmonic wave.

Further, the communication circuit 16 further includes the auxiliary output terminal 34*b* that outputs the transmission signal TX1 to the external circuit 116 and the switch 54 that switches the electrical connection destination of the second end part of the first element between the auxiliary output terminal 34*a* and the auxiliary output terminal 34*b*.

According to the configuration described above, in the case where a user of the communication circuit 16 uses transmission signals TX1 of two bands that do not fit into the band of the duplexer 61*a*, the transmission signals TX1 of two bands can be supplied to the external circuit 116 through the auxiliary output terminals 34*a* and 34*b*.

Further, the external circuit 116 includes the second element that is another part of the filter 46 and has the first end part connected to the auxiliary output terminal 34*a* and the second end part connected to the ground, and the third element that is another part of the filter 46 and has the first end part connected to the auxiliary output terminal 34*b* and the second end part connected to the ground.

According to the configuration described above, the filter characteristic of the filter 46 can be varied for each auxiliary output terminal 34. Because of this, in the case where the transmission signals TX1 of two bands are supplied to the external circuit 116 through the auxiliary output terminals 34*a* and 34*b*, the filter characteristic can be optimized in each band. Thus, it becomes possible to supply the transmission signals TX1 of two bands, each of which has passed through the optimized filter.

Further, the communication device 106 includes the communication module 156, in which the communication circuit 16 is formed, and the shield members 211 and 212, which are provided in the communication module 156 and positioned between the inductor 47 and the variable filter 75.

According to the configuration described above, the shield members 211 and 212 positioned between the inductor 47 and the variable filter 75 enables the suppression of electromagnetic coupling between the inductor included in the variable filter 75 and the inductor 47. According to this, the characteristic degradation such as generation of noise and decrease in attenuation can be suppressed.

Further, the communication device 106 includes the communication module 156 in which the communication circuit 16 is formed, and in the communication module 156, another component is provided between the inductor 47 and the variable filter 75.

According to the configuration described above, it becomes possible to provide the inductor 47 at a position away from the variable filter 75, and thus, the electromagnetic coupling between the inductor included in the variable filter 75 and the inductor 47 can be suppressed. According to this, the characteristic degradation such as generation of noise and decrease in attenuation can be suppressed.

Further, the communication device 106 includes the module board 156*a* having a rectangular shape, and on the module board 156*a*, the communication circuit 16 is formed. On the module board 156*a*, the distance D1 between the inductor 47 and the variable filter 75 is longer than ¼ of length of the diagonal line 156*b* of this rectangular shape.

According to the configuration described above, the inductor 47 can be provided at a position away from the variable filter 75, and it becomes possible to suppress the electromagnetic coupling between the inductor included in the variable filter 75 and the inductor 47. According to this, the characteristic degradation such as generation of noise and decrease in attenuation can be suppressed.

Further, the communication circuit 11 includes the transmission terminal 31 to which a transmission signal TX1 is supplied, the antenna terminal 32, the variable filter 75 that has the first end part and the second end part, the auxiliary output terminal 34*a* that outputs the transmission signal TX1 to the external circuit 111, the duplexer 61*a* that has the transmission node, the reception node, and the common node, the wiring line 62 that has the first end part and the second end part, the switch 52 that switches the electrical connection destination of the transmission terminal 31 between the transmission node of the duplexer 61*a* and the first end part of the wiring line 62, the switch 72 that switches the electrical connection destination of the first end part of the variable filter 75 between the common node of the duplexer 61*a* and the second end part of the wiring line 62, and the switch 73 that switches the electrical connection destination of the second end part of the variable filter 75 between the auxiliary output terminal 34*a* and the antenna terminal 32.

According to the configuration described above, in a case that the electrical connection destination of the transmission terminal 31 is switched to the transmission node of the duplexer 61*a* in the switch 52, the electrical connection destination of the first end part of the variable filter 75 is switched to the common node of the duplexer 61*a* in the switch 72, and the electrical connection destination of the second end part of the variable filter 75 is switched to the antenna terminal 32 in the switch 73, it becomes possible to form the signal transmitting path from the transmission terminal 31 to the antenna terminal 32 via the duplexer 61*a* and the variable filter 75. Further, in a case that the electrical connection destination of the transmission terminal 31 is switched to the first end part of the wiring line 62 in the switch 52, the electrical connection destination of the first end part of the variable filter 75 is switched to the second end part of the wiring line 62 in the switch 72, and the electrical connection destination of the second end part of the variable filter 75 is switched to the auxiliary output terminal 34*a* in the switch 73, it becomes possible to form the signal transmitting path from the transmission terminal 31 to the auxiliary output terminal 34*a* via the wiring line 62 and the variable filter 75. The variable filter 75 can be shared in both the signal transmitting path including the duplexer and the signal transmitting path including no duplexer, and thus, it becomes possible to reduce the number of filters in the communication circuit 11. Accordingly, in the configuration in which a signal transmitting path including a duplexer and a signal transmitting path including no duplexer can be switched therebetween, it becomes possible to suppress an increase in circuit size and allow a signal to pass a filter in both the signal transmitting paths.

Further, the communication circuit 11 further includes the duplexer 61*b* that has the transmission node, the reception node, and the common node, the switch 52 switches the electrical connection destination of the transmission terminal 31 between the transmission node of the duplexer 61*a*, the transmission node of the duplexer 61*b*, and the first end part of the wiring line 62, and the switch 72 switches the electrical connection destination of the first end part of the variable filter 75 between the common node of the duplexer 61*a*, the common node of the duplexer 61*b*, and the second end part of the wiring line 62.

According to the configuration described above, it becomes possible to add the signal transmitting path from the transmission terminal 31 to the antenna terminal 32 via the duplexer 61*b* and the variable filter 75. Thus, it becomes possible to add a general-purpose band that can be used in the communication circuit 11. Further, the variable filter 75 can be shared in both the signal transmitting path including the duplexer 61*a* and the signal transmitting path including the duplexer 61*b*, and thus, it becomes possible to add a signal transmitting path without increasing the number of filters in the communication circuit 11.

Further, the communication circuit 11 further includes the input/output terminal 45*a* to which the transmission signal TX1 is supplied from the external circuit 111 and from which the reception signal RX1 is output to the external circuit 111, and the switch 74 that switches between electrically connecting the antenna terminal 32 to the input/output terminal 45a and electrically not connecting the antenna terminal 32 to the input/output terminal 45a.

According to the configuration described above, the transmission signal TX1 having been output from the auxiliary output terminal 34a to the external circuit 111 can be output to the antenna terminal 32 via the input/output terminal 45a. Further, the reception signal RX1 supplied from the antenna terminal 32 can be output to the external circuit 111 via the input/output terminal 45a. According to this, it becomes possible to form the signal transmitting paths of the transmission signal TX1 and the reception signal RX1 that go through the external circuit 111.

Further, in the communication circuit 11, the attenuation in the first attenuation band, in which the first transmission signal supplied to the antenna terminal 32 via the duplexer 61a and the variable filter 75 is attenuated by the variable filter 75, is greater than the attenuation in the second attenuation band, in which the second transmission signal supplied to the auxiliary output terminal 34a via the wiring line 62 and the variable filter 75 is attenuated by the variable filter 75.

According to the configuration described above, it becomes possible to ensure preferential characteristic improvements of the first transmission signal, such as suppression of loss of the carrier wave thereof and attenuation of an unwanted wave or unwanted waves, compared with the second transmission signal. Further, also with regard to the second transmission signal, characteristic improvements can be achieved by adding a filter circuit, a matching circuit, and the like to the external circuit 111.

Note that each of the embodiments described above is provided to facilitate understanding of the present disclosure and is not to be construed as limiting the present disclosure. The present disclosure can be modified or improved without departing from its spirit, and the present disclosure also includes equivalents thereof. That is to say, ones obtained by suitably modifying designs of the respective embodiments by those skilled in the art are also included within the scope of the present disclosure so long as they include characteristic features of the present disclosure. For example, each constituent element included in each embodiment as well as its arrangement, material, condition, shape, size, and the like are not limited to those exemplified, and may be suitably changed. Needless to say, each embodiment is for illustrative purposes only, and constituent elements illustrated in different embodiments may be combined or partially exchanged. Resulting embodiments are also included in the scope of the present disclosure so long as the characteristic features of the present disclosure are included.

<1>
A communication circuit comprising:
a transmission terminal to which a transmission signal is supplied;
a first duplexer that has a transmission node, a reception node, and a common node;
a first filter that has a first end part electrically connected to the common node of the first duplexer and a second end part electrically connected to an antenna terminal;
a first auxiliary output terminal that outputs the transmission signal to an external circuit;
a first element that is part of a second filter and has a first end part and a second end part, the second end part being electrically connected to the first auxiliary output terminal; and
a first switch that switches an electrical connection destination of the transmission terminal between the transmission node of the first duplexer and the first end part of the first element.

<2>
The communication circuit according to <1>, further comprising:
a second duplexer that has a transmission node, a reception node, and a common node; and
a second switch that switches an electrical connection destination of the first end part of the first filter between the common node of the first duplexer and the common node of the second duplexer, wherein
the first filter is a variable filter, and
the first switch switches the electrical connection destination of the transmission terminal between the transmission node of the first duplexer, the transmission node of the second duplexer, and the first end part of the first element.

<3>
The communication circuit according to <1> or <2>, wherein
the external circuit includes a second element that is another part of the second filter and has a first end part connected to the first auxiliary output terminal and a second end part connected to ground.

<4>
The communication circuit according to any one of <1> to <3>, wherein
the first element is a first inductor.

<5>
The communication circuit according to <3>, wherein
the first element is a first inductor, and
the second element is a capacitor.

<6>
The communication circuit according to <5>, wherein
the external circuit further includes a second inductor connected in series to the capacitor.

<7>
The communication circuit according to any one of <1> to <6>, further comprising:
a second auxiliary output terminal that outputs the transmission signal to the external circuit; and
a third switch that switches an electrical connection destination of the second end part of the first element between the first auxiliary output terminal and the second auxiliary output terminal.

<8>
The communication circuit according to <7>, wherein
the external circuit includes
a second element that is another part of the second filter and has a first end part connected to the first auxiliary output terminal and a second end part connected to ground, and
a third element that is another part of the second filter and has a first end part connected to the second auxiliary output terminal and a second end part connected to ground.

<9>
A communication device comprising:
a module in which the communication circuit according to any one of <4> to <6> is formed; and a shield member provided in the module, the shield member being positioned between the first inductor and the first filter.

<10>
A communication device comprising:
a module board on which the communication circuit according to any one of <4> to <6> is formed, wherein
on the module board, another component is provided between the first inductor and the first filter.

<11>
A communication device comprising:
a module board on which the communication circuit according to any one of <4> to <6> is formed, the module board having a rectangular shape, wherein
on the module board, a distance between the first inductor and the first filter is longer than ¼ of length of a diagonal line of the rectangular shape.

<12>
A communication circuit comprising:
a transmission terminal to which a transmission signal is supplied;
an antenna terminal;
a variable filter that has a first end part and a second end part;
a first auxiliary output terminal that outputs the transmission signal to an external circuit;
a first duplexer that has a transmission node, a reception node, and a common node;
a wiring line that has a first end part and a second end part;
a first switch that switches an electrical connection destination of the transmission terminal between the transmission node of the first duplexer and the first end part of the wiring line;
a second switch that switches an electrical connection destination of the first end part of the variable filter between the common node of the first duplexer and the second end part of the wiring line; and
a third switch that switches an electrical connection destination of the second end part of the variable filter between the first auxiliary output terminal and the antenna terminal.

<13>
The communication circuit according to <12>, further comprising:
a second duplexer that has a transmission node, a reception node, and a common node, wherein
the first switch switches the electrical connection destination of the transmission terminal between the transmission node of the first duplexer, the transmission node of the second duplexer, and the first end part of the wiring line, and
the second switch switches the electrical connection destination of the first end part of the variable filter between the common node of the first duplexer, the common node of the second duplexer, and the second end part of the wiring line.

<14>
The communication circuit according to <12> or <13>, further comprising:
a first input/output terminal to which the transmission signal is supplied from the external circuit and from which a reception signal is output to the external circuit; and
a fourth switch that switches between electrically connecting the antenna terminal to the first input/output terminal and electrically not connecting the antenna terminal to the first input/output terminal.

<15>
The communication circuit according to any one of <12> to <14>, wherein
an attenuation in an attenuation band where the transmission signal supplied to the antenna terminal via the first duplexer and the variable filter is attenuated by the variable filter is greater than an attenuation in an attenuation band where the transmission signal supplied to the first auxiliary output terminal via the wiring line and the variable filter is attenuated by the variable filter.

What is claimed is:
1. A communication circuit comprising:
a transmission terminal to which a transmission signal is supplied;
a first duplexer that has a transmission node, a reception node, and a common node;
a first filter that has a first end part electrically connected to the common node of the first duplexer and a second end part electrically connected to an antenna terminal;
a first auxiliary output terminal that outputs the transmission signal to an external circuit;
a first inductor that is part of a second filter and has a first end part and a second end part, the second end part being electrically connected to the first auxiliary output terminal; and
a first switch that switches an electrical connection destination of the transmission terminal between the transmission node of the first duplexer and the first end part of the first inductor.

2. The communication circuit according to claim 1, further comprising:
a second duplexer that has a transmission node, a reception node, and a common node; and
a second switch that switches an electrical connection destination of the first end part of the first filter between the common node of the first duplexer and the common node of the second duplexer, wherein
the first filter is a variable filter, and
the first switch switches the electrical connection destination of the transmission terminal between the transmission node of the first duplexer, the transmission node of the second duplexer, and the first end part of the first inductor.

3. The communication circuit according to claim 1, wherein
the external circuit includes a capacitor that is another part of the second filter and has a first end part connected to the first auxiliary output terminal and a second end part connected to ground.

4. The communication circuit according to claim 1, wherein
the external circuit includes a second inductor.

5. The communication circuit according to claim 1, wherein
the first inductor is connected in series to the signal transmitting path.

6. The communication circuit according to claim 4, wherein
the second inductor is connected in series to the capacitor.

7. The communication circuit according to claim 1, further comprising:
a second auxiliary output terminal that outputs the transmission signal to the external circuit; and
a third switch that switches an electrical connection destination of the second end part of the first element between the first auxiliary output terminal and the second auxiliary output terminal.

8. The communication circuit according to claim 7, wherein
the external circuit includes
a first capacitor that is another part of the second filter and has a first end part connected to the first auxiliary output terminal and a second end part connected to ground, and
a second capacitor that is another part of the second filter and has a first end part connected to the second auxiliary output terminal and a second end part connected to the ground.

9. A communication device comprising:
a module in which the communication circuit according to claim 1 is formed; and
a shield member provided in the module, the shield member being positioned between the first inductor and the first filter.

10. A communication device comprising:
a module board on which the communication circuit according to claim 1 is formed, wherein
on the module board, another component is provided between the first inductor and the first filter.

11. A communication device comprising:
a module board on which the communication circuit according to claim 1 is formed, the module board having a rectangular shape, wherein
on the module board, a distance between the first inductor and the first filter is longer than ¼ of length of a diagonal line of the rectangular shape.

12. A communication circuit comprising:
a transmission terminal to which a transmission signal is supplied;
an antenna terminal;
a variable filter that has a first end part and a second end part;
a first auxiliary output terminal that outputs the transmission signal to an external circuit;
a first duplexer that has a transmission node, a reception node, and a common node;
a wiring line that has a first end part and a second end part;
a first switch that switches an electrical connection destination of the transmission terminal between the transmission node of the first duplexer and the first end part of the wiring line;

a second switch that switches an electrical connection destination of the first end part of the variable filter between the common node of the first duplexer and the second end part of the wiring line; and
a third switch that switches an electrical connection destination of the second end part of the variable filter between the first auxiliary output terminal and the antenna terminal.

13. The communication circuit according to claim 12, further comprising:
a second duplexer that has a transmission node, a reception node, and a common node, wherein
the first switch switches the electrical connection destination of the transmission terminal between the transmission node of the first duplexer, the transmission node of the second duplexer, and the first end part of the wiring line, and
the second switch switches the electrical connection destination of the first end part of the variable filter between the common node of the first duplexer, the common node of the second duplexer, and the second end part of the wiring line.

14. The communication circuit according to claim 12, further comprising:
a first input/output terminal to which the transmission signal is supplied from the external circuit and from which a reception signal is output to the external circuit; and
a fourth switch that switches between electrically connecting the antenna terminal to the first input/output terminal and not electrically connecting the antenna terminal to the first input/output terminal.

15. The communication circuit according to claim 12, wherein
an attenuation in an attenuation band where the transmission signal supplied to the antenna terminal via the first duplexer and the variable filter is attenuated by the variable filter is greater than an attenuation in an attenuation band where the transmission signal supplied to the first auxiliary output terminal via the wiring line and the variable filter is attenuated by the variable filter.

* * * * *